Oct. 18, 1955
J. L. CANALES
2,721,016
LOADING MECHANISM FOR FROZEN CONFECTION BAGGING MACHINES
Filed Aug. 4, 1950
2 Sheets-Sheet 1
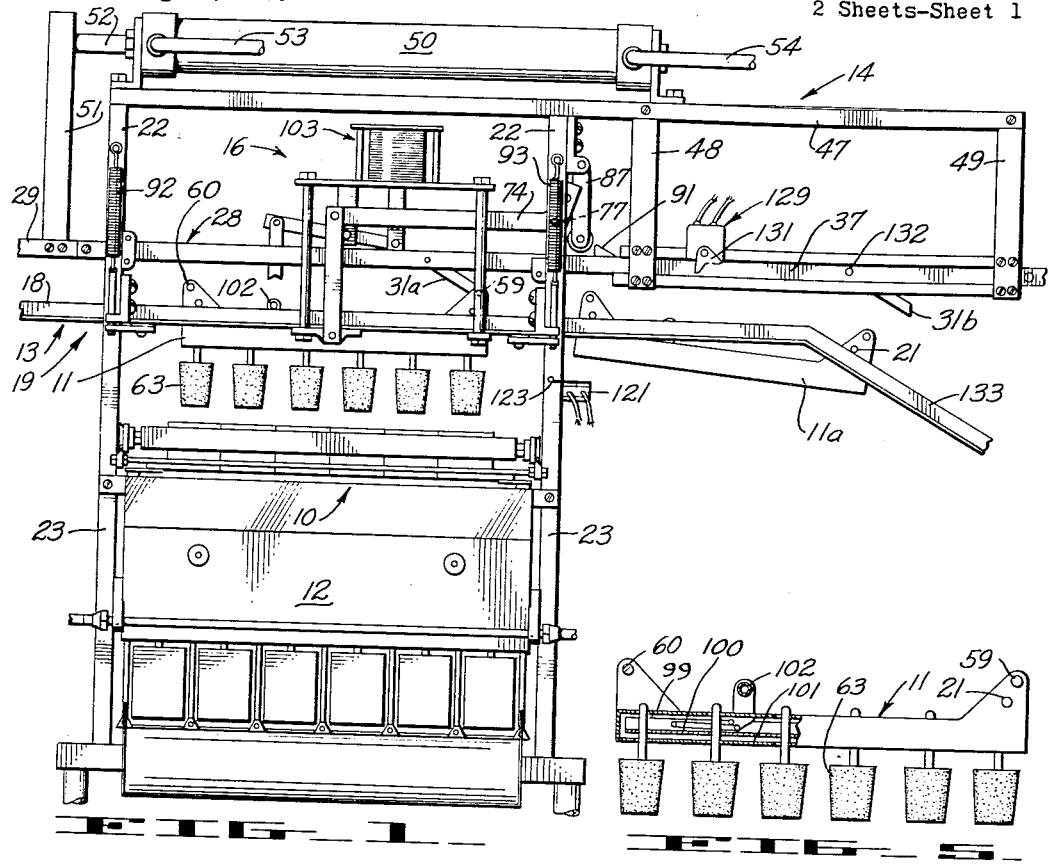
FIG_1
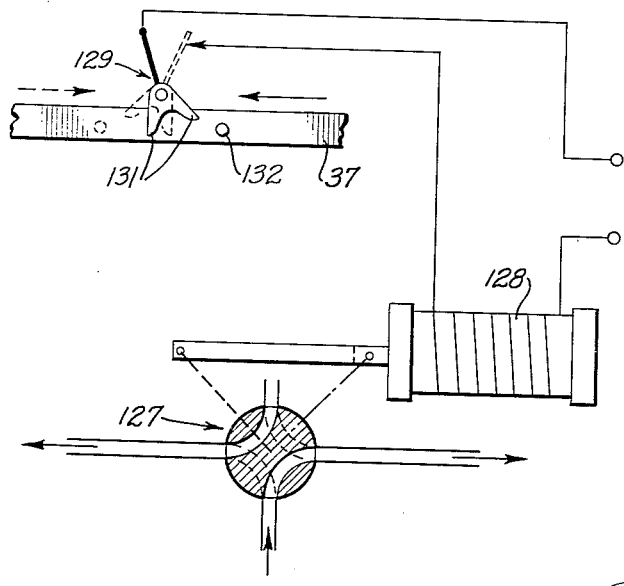
FIG_5
FIG_6
INVENTOR.
JOHN L. CANALES
BY
Manfred M. Warren
His Attorney Oct. 18, 1955  J. L. CANALES  2,721,016
LOADING MECHANISM FOR FROZEN CONFECTION BAGGING MACHINES
Filed Aug. 4, 1950  2 Sheets-Sheet 2

INVENTOR.
JOHN L. CANALES
BY Manfred M. Warren
His attorney 2,721,016
Patented Oct. 18, 1955

United States Patent Office

2,721,016
LOADING MECHANISM FOR FROZEN CONFECTION BAGGING MACHINES

John L. Canales, Dixon, Calif., assignor to Dixon Engineering Company, a copartnership Application August 4, 1950, Serial No. 177,713

10 Claims. (Cl. 226—2)

The invention relates to machines for bagging frozen confections such as disclosed in my copending application, Serial No. 163,225, filed May 20, 1950, for Automatic Bagging Machine, and more particularly to mechanisms for transporting the confections while carried by a stickholder to the magazine of such a bagging machine and for releasing the confections therein.

In the manufacture of frozen confections of the type having an edible head and one or more stick handles, the usual method for transporting the confections through the various forming, freezing and dipping processes is to insert the confection stick handles into a carrier or stickholder as the device is known in the art. This stickholder is adapted to grasp a desired number of stick handles with the major portion of the handles carrying the edible heads and depending from the stickholder in a grid-like arrangement of parallel rows and columns. A thin frangible coating of chocolate or the like is often provided on the confections and, when it is desired to utilize an automatic bagging machine such as that shown in my copending application aforesaid, having a magazine formed with confection receiving compartments disposed in a grid-like arrangement similar to that of the stickholder for receiving the confections therefrom, manual positioning of the stickholder and release of the confections therefrom has a tendency to cause injury to these coatings because of the danger of striking the unprotected confections against portions of the bagging machine and because of the fact that the confections have to fall several inches from the holder into the receiving magazine of the bagging machine. It is therefore an object of the present invention to provide a machine of the character described which will, at high speed, transport a loaded confection stickholder to a bagging machine and will quickly transfer the confections from the stickholder to the bagging machine magazine in a careful and precise manner, notwithstanding the high speed of operation, avoiding striking or dropping of the confections which might break, crack, chip, mar or otherwise injure their fragile coatings.

Another object of the invention is to provide a machine of the character above in which the complete cycle of operation from the placing of the loaded stickholders on the conveyor to the transfer of the confections and removal of the empty stickholders is fully automatic and does not require the constant attendance of an operator.

A further object of the invention is to provide a machine of the character described which has a minimum number of sturdy and efficient parts designed for long operating life and maximum simplicity and accessibility for ease in cleaning and maintaining in a sanitary condition.

A still further object of the invention is to provide a machine of the character described including a conveyor for stickholders which has a positive intermittent drive adapted to move the stick holders therealong in desired and constant increments, thereby insuring the precise positioning of successive stick holders at the loading position of the bagging machine.

The invention possesses other objects and features of advantage, some of which, with the foregoing, will be set forth in the following description of the preferred form of the invention which is illustrated in the drawings accompanying and forming part of the specification. It is understood, however, that variations in the showing made by said drawings and description may be adopted within the scope of the invention as set forth in the claims.

Referring to said drawings:

Figure 1 is a front elevational view of a loading mechanism constructed in accordance with the present invention and mounted in operative position upon a confection bagging machine.

Figure 5 is a side elevational view of a conventional confection stickholder used with the mechanism of my invention and has a portion of the side broken away to disclose internal construction.

Figure 6 is a diagrammatic representation of the control circuit coordinating the action of the automatic bagger and the loading mechanism.

Figure 2:
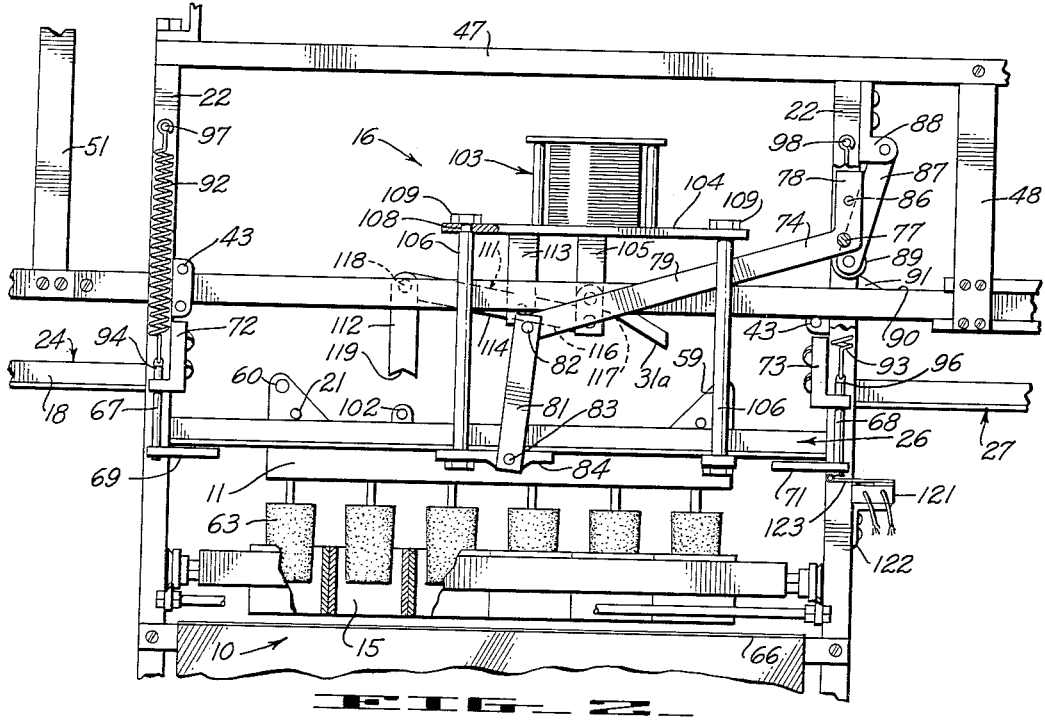
Figure 2 is a fragmentary front elevational view of the mechanism illustrated in Figure 1 on an enlarged scale with the elevator portion thereof in its down delivery position and with portions of the structure broken away for clarity of illustration.

The machine, as illustrated in the accompanying drawings and as hereinabove characterized, is adapted to transport a confection loaded stickholder 11 from the freezing and dipping tanks (not shown) in which the confections are manufactured to a position overlying the magazine 10 of a bagging machine 12 and to gently deliver the confections into open topped compartments 15 in the magazine. Basically, the mechanism for accomplishing this includes horizontal conveyor means 13 arranged to cooperate with elevator and positioning means 14 and release means 16 to effect such transport and delivery of the confections.

As shown in the accompanying drawings, the conveyor means 13 here includes a pair of horizontally extending parallel conveyor rails 17 and 18 formed from angle iron or the like and spaced and arranged to form a track 19 adapted to slidably support lugs 21 which extend from the sides of the stickholder 11 at front and rear. The track 19 may be supported by any suitable means such as upward extensions 22 of the frame 23 of the bagging machine 12, and is preferably divided into a feeder section 24 leading from the aforementioned freezing and dipping tanks, an elevator section 26 mounted for vertical movement, and a takeaway section 27 arranged for disposal of the empty stickholders.

Transit of the stickholder 11 over the track 19 is here accomplished by pusher means 28 which consists of a pusher bar 29 having depending lug members 31 and mounted for endwise reciprocation in parallel spaced relation over the track. The pusher bar 29 here consists of a pair of parallel strap iron members 32 and 33 secured together by means of rivets 34 or the like passing through spacers 36 (see Figure 4). It will be noted from Figure 3 that the pusher means is split into two parallel pusher bars 37 and 38 in order to leave the central area over the elevator clear for the release means 16. The pusher bars 37 and 38 are constructed in a similar manner to the pusher bar 29 above described and are connected by a yoke member 39 which is in turn connected to the pusher bar 29 by means of a clip 41 and screws 42. Roller assemblies 43 secured to the frame extensions 22 are arranged to support the pusher means for reciprocation and the ends of the bars 37 and 38 which are remote from the yoke member are slidably carried by blocks 44 and 46 supported by frame members 47, 48 and 49 to aid in maintaining alignment thereof.

The above mentioned reciprocation of the pusher means 28 is here accomplished by drive means including a reciprocating actuator 50, here of the pneumatic piston and cylinder type, carried by the frame members 47 parallel with the track and the pusher bars and connected to the latter by a vertical member 51 secured to the pusher bar 29 and to the piston rod 52 of the actuator. The actuator may be supplied with air or other fluid under pressure from a suitable source such as a reservoir or compressor (not shown) through an appropriate two way control valve (not shown) and conduits 53 and 54 connected to the opposite ends of the cylinder.

Advancement of the stickholder 11 along the track 19 is effected through one way engagement of the lug members 31 with the stickholder as may best be seen in Figure 1 of the drawings. The depending lug members 31, consisting of members 31a and 31b, are pivotally mounted to the pusher bar 29 on pins 56 journalled therein and are of elongated shape with beveled portions 57 and 58 provided on their opposite ends. The beveled portion 58 on the lower end of the lug member is adapted to engage the forward carrying handle 59 of the stickholder 11 as it rests on the track 19 for pushing the stickholder along the rails 17 and 18, and is held in position for such engagement by abutment of the upper portion 57 against the lower face of a stop member 61 secured across the upper side of the pusher bar straps 32 and 33 above the pin 56. The disposition of the parts is such that, as the pusher bar reciprocates, the beveled portion 58 of the lug member 31 during the forward or drive stroke, that is the stroke to the right as viewed in the drawings, will engage the stickholder handle 59 and will urge the stickholder along the track for the length of the stroke. Upon reaching the end of the stroke and starting back, the lug member, being free to pivot upwardly about the pin away from the stop, will ride up and over the rearwardly disposed handle 60 of the stickholder and similarly clear and drop down into place behind the forward handle of the next rearwardly arranged stickholder. The relative spacing of the lug members along the length of the pusher bar, the length of the forward and return strokes of the drive means, and the length of the stickhandle are so correlated as viewed in the drawing, and the pusher bar and lug members are so arranged with respect to the bagging machine and its magazine, that on each successive forward stroke of the pusher bar a stickholder will be picked up and displaced forwardly along the track onto the elevator track section 26 in precise position over the open topped magazine 10. As here shown, the spacing between the lug members along the pusher bar is somewhat less than the length of the forward and return strokes but somewhat greater than the length of the stickholder, and the lug member 31a is so positioned along the length of the pusher bar as to accurately advance a loaded stickholder into position for discharging into the magazine of the bagging machine at the forward end of each drive stroke. In the ensuing return stroke, the lug member 31a will drop back and pick up the forward handle of the next rearwardly arranged stickholder and on the succeeding forward stroke advance such stickholder into discharging position as illustrated in Figure 1. In a similar manner the lug member 31b arranged forwardly of 31a will on each return stroke of the pusher bar drop into position behind the forward handle of the stickholder theretofore moved into discharging position and on the ensuing forward stroke carry such stickholder forwardly along the track away from the bagging machine and onto the take-away section 27 of the track. In this arrangement it will be noted that the stickholders are always spaced from each other and are individually moved along the track and no dependence is made on pushing one stickholder against the other. Consequently the mechanism will handle and properly transport and advance stickholders which may have damaged or misaligned end portion.

As an important feature of the invention, the elevator and positioning means 14 is adapted to lower the elevator section of track 26 together with a loaded confection stickholder 11 over the magazine 10 of the bagging machine 12 until the depending confection heads 63 are each positioned within an individual open top and bottom compartment 15 in the magazine as shown in Figure 2. This positioning of the confections within the compartments is very important in order to reduce the distance which the confections must fall to the magazine drop plate 66 which underlies the magazine and supports the confections in their respective compartments, and to assure that any twisting motion of the confections during their drop will not cause them to miss their respective compartments. Registry of the confection heads with the compartments is assured by the precise positioning of the stickholder on the elevator track section 26 by the aforementioned action of the pusher means 28 and by the vertical alignment of the track section with the magazine 10 when it is in its confection receiving position. This alignment is maintained throughout the vertical travel of the elevator by means of vertical guide posts 67 and 68 which are secured to the track section 26 through brackets 69 and 71 and which are slidably journaled in guide brackets 72 and 73 secured to the upward extensions 22 of the frame.

Drive and positioning means for effecting lowering of the elevator are provided and as here shown include bell crank members 74 and 76 adapted to be actuated by the return stroke of the aforementioned pusher means 28. As may be best seen in Figure 1 of the drawings, the bell crank members 74 and 76 are identical in action and in associated parts and therefore a description of the bell crank member 74 together with associated parts will suffice for both. Accordingly, it will be seen from Figures 1 and 2 of the drawings that the bell crank member 74 is journaled for rocking action on a pin 77 carried by the frame extension 22 and is disposed with a shorter arm 78 extending generally upwardly. A longer arm 79 of the bell crank member is operatively connected to the elevator section of track 26 by means of a link member 81 journaled at one end 82 to the distal end of the arm 79 and pivotally mounted at its other end 83 to a connecting member 84 suitably secured to the rail 18 of the elevator section of track 26. A pin 86 is secured in the arm 78 and projects therefrom for engagement with one side of a lever 87 journaled for swinging movement in a bearing member 88 carried by the frame extension 22 above pin 77. The lever 87 is provided with a roller 89 at its free depending end which is arranged to be engaged by a cam lug 91 carried on the upper side 90 of the pusher bar 37 during its reciprocating movement. As will be seen from an examination of the drawings, Figure 1 illustrates the relative positions of the parts as the pusher means 28 reaches the end of its drive stroke and the stickholder reaches vertical alignment with the magazine 10, while Figure 2 shows the elevator approaching its lowermost position with the confection heads positioned within the compartments 15 and with the cam lug 91 in operative engagement with the roller 89 carried by the lever 87. It will be apparent from the arrangement of the swinging lever 87 and the bell crank member 74 that as the pusher bar travels to the left as viewed in the drawings the cam lug 91 will engage the roller 89 and urge the swinging lever 87 to the left. This motion is transmitted through the bell crank member to the connecting link member 81 and thence to the elevator section 26 to lower it and the stickholder carried thereon. During the return stroke of the pusher bar, the cam lug will again engage the roller and will swing the lever in the other direction away from the pin 86 without effecting displacement of the track section. Because of the free swinging character of the lever 87 it will be obvious that the roller 89 will swing into reset position under the influence of gravity after the cam lug has passed from engagement. Return of the elevator to its up position in alignment with the rest of the track 19 is here effected by springs 92 and 93 secured at their lower ends to the upper ends 94 and 96 of the posts 67 and 68 and at their upper ends to pins 97 and 98 carried by the frame extensions 22, a stop being provided to locate the up position of the elevator track by engagement of brackets 69 and 72 on the elevator track and frame respectively with the guides 72 and 73.

As an important feature of the present invention and as mentioned above, release means 16 are provided for releasing the confection stick handles from the stickholder 11 to drop the confections into their individual compartments when the elevator track section 26 reaches its lowermost position and the confection heads 63 are positioned within the compartments 15 in the magazine 10.

The conventional stickholder has been illustrated in Figure 5 in sufficient detail to show the gripping and release functions of the stickholder. The device is constructed with three parallel plates 99, 100 and 101, having aligned perforations to receive the stick handles, the gripping of the handles being effected by the relative lateral displacement of the center plate 100, and the releasing of the handles being effected upon a return of the center plate to align the perforations and thereby permit a dropping out of the stick handles. This displacement of the center plate is accomplished by means of a handle member 102 which is suitably linked to the center plate to effect a releasing of the confections upon depression of the handle 102, and contra-wise, a gripping of the stick handles upon a relative elevation of the handle with respect to the body of the stickholder. This type of stickholder is widely used in the manufacture of frozen confections having stick handles for carrying and transporting the confections in the freezing, dipping and other operations, and the customary stickholder is constructed as hereinabove noted with the separate lugs 16 and the fore and aft carrying handles 59 and 60 hereinabove described.

As here shown, the release means 16 includes an electric solenoid actuator 103 carried by the elevator track section 26 for movement therewith and arranged to engage and press downwardly the stickholder release means 102 to effect release of the confections when the elevator reaches its lowermost point. The solenoid actuator 103 is preferably of the normally extended type and is mounted upon a plate 104 with its armature core 105 disposed vertically as is shown in Figures 1 and 2 of the drawings. The plate 104 is supported by rods 106 secured to the elevator rails by the connecting member 84 above noted and by lug members 107, the rods as here shown being of sufficient length to support the plate 104 above the pusher means 28 to avoid interference therewith when the elevator is in lowered position. As may be seen in Figure 2 of the drawings, the rods 106 are provided with reduced diameter threaded end portions 108 arranged to pass through appropriate openings in the plate 103 and the connecting members 84 and 107, and the assembly is secured by nuts 109 threaded on the portions 108.

In order to translate and amplify the upward motion of the solenoid armature 105 into the required downward displacement of the release handle 102 of the stickholder, an amplifying lever 111 is operatively connected between the armature 105 and the actuator member 112 disposed for engagement with the release means 102. The lever 111 is here pivotally connected intermediate its ends to a depending bracket arm 113 carried by plate 104 to provide relatively short and long lever arms 114 and 116 respectively; the shorter arm 114 is pivotally connected to the lower end of the armature 105 through a link member 117, while an actuator member 112 is freely pivoted to and depends from the free end of the long arm 116. As will be seen from Figures 1 and 2, the actuator member 112 is carried by a pivot pin 118 at the free end of the lever arm 116 with the lower end 119 of the member 112 directly over the release handle 102 of the stickholder. Preferably the latter end is forked or indented to insure proper seating upon the handle portion 102 upon being depressed by the solenoid actuator. Energizing of the solenoid actuator to effect a release of the confection as the elevator track reaches substantially its lowermost position is here under the control of an electric switch 121 which is mounted for actuation by the lowering track section and is electrically connected to a suitable source of electrical potential and to the field winding of the solenoid actuator. As here shown, the switch is of the normally circuit open snap acting micro-switch type, and may be conveniently mounted on a bracket 122 with its actuating arm 123 located for engagement with and displacement by one of the guide post brackets 71 so that upon lowering of the track section the bracket 71 will engage and displace the switch arm 123 to close the electric circuit to the solenoid actuator. Contra-wise, upon raising of the elevator track section the switch arm 129 will be disengaged for automatic opening of the electric circuit when the armature 105 will be released for retraction of the actuator 112 from the release handle 102 of the stickholder.

Figure 3:
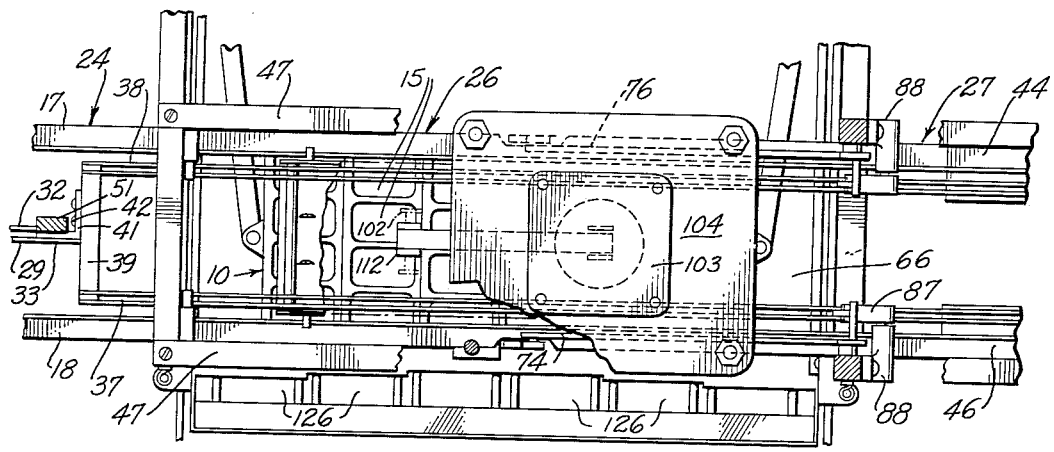
Figure 3 is a plan view partially in section of the portion of the machine shown in Figure 2 with certain portions broken away for better showing of underlying structure.
Figure 4:
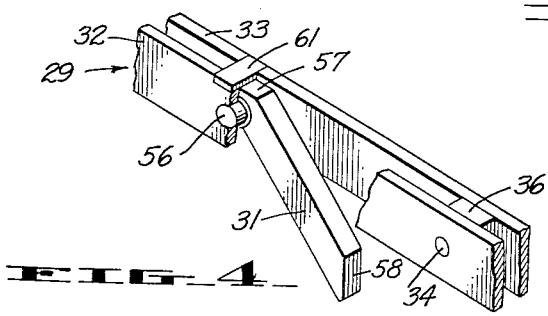
Figure 4 is a perspective detail view of a pusher bar and associated lug member forming part of the conveyor drive.

The automatic bagging machine with which the present loading mechanism is particularly adapted for use is illustrated only in part in the present application so as to show its operative connection with the present invention and is more fully illustrated and described by co-pending application aforementioned. As hereinabove noted, the bagging machine is provided with the magazine 10 which is supported in the bagging machine for horizontal reciprocation from the receiving or loading position as illustrated in Figure 3 to forwardly advanced delivery position, wherein the several magazine compartments 15 are brought into successive registration with a plurality of vertical chutes 126 seen in plan in Figure 3 for delivery to the bagging means (not shown) forming part of my co-pending application. With further reference to my co-pending application, reciprocation of the magazine between its receiving and delivery positions is effected by a pneumatic actuator under the control of a two-way valve 127 illustrated diagrammatically in Figure 6, it being sufficient to note here that actuation of the valve to its position as illustrated in Figure 6 will cause the magazine 10 to be displaced to its receiving position, and upon displacement of the valve to its second position as illustrated by dotted lines in Figure 6 the magazine will be displaced to its delivery position. In accordance with the present invention means is provided for operating valve 127 in sequential relation to the operation of the loading means so that the confections will be successively delivered to the magazine, transported to the chutes and bagging means and the several parts restored for the next succeeding cycle of operation. Such means may comprise a solenoid actuator 128 diagrammatically illustrated in Figure 6, and being appropriately connected to the valve 127 to normally retain the latter in position illustrated when the solenoid is not energized but to displace the valve to its second position when the actuator is energized. Energizing of the actuator 128 is here controlled by an electric switch 129 which may be conveniently secured to the block 46 adjacent to the pusher bar 37 and having connected and divergent operating arms 131 mounted and arranged for engagement and displacement by a pin 132 on the pusher bar 37, the arrangement of the arms being such as to engage the pin in opposite directions of travel thereof. The electrical connection for the switch is illustrated in Figure 6 wherein it will be noted that the switch is displaced to open position when the pusher bar 37 is advanced, thereby causing the rearward movement of the magazine of the bagging machine and, conversely, the switch is displaced to closed position during the reverse movement of the pusher bar 37, thereby causing the movement of the magazine to delivery position. It is to be noted, however, that the location of the switch and pin 132 is such that the magazine will not be displaced from its receiving towards its delivery position until after the elevator track section 26 has gone through its cycle of operation.

In the operation of the loading mechanism, one or a plurality of loaded stickholders 11 are placed on the conveyor track 19. This track and the pusher bar advancement means hereinabove described may extend back to the cold tunnel and/or chocolate and other cooling and dipping apparatus whereby the bagging machine may be integrally tied in with the manufacturing process. In any event, the loaded stickholders on the feeder 19 will be successively advanced in one-at-a-time order onto the elevator track section 26 upon each forward stroke of the pusher bar. By the same operation, each forward stroke of the pusher bar will remove an empty stickholder from the elevator track section 26 onto the take-away track section 27 which, as will be seen from Figure 1, is provided with a downwardly inclined portion 133 for the removal of the empty stickholders by sliding gravity action onto an unloading table (not shown) or the like. During the first portion of such forward stroke of the pusher bar pin 132 displaces switch 129 to its open position, thereby de-energizing solenoid actuator 128 which thereupon returns to the position shown in Figure 6, operating valve 127 to cause the return movement of the empty magazine 10 of the bagging machine to its receiving position.

As the pusher bar 37 starts its return stroke, cam lug 91 will engage the roller 89 and cause a downward swinging of the bell crank member 74 to effect the lowering of the elevator track with a loaded stickholder thereon.

As will be understood, this lowering is effected against the resistance of springs 92 and 93. As the elevator track reaches its lowermost position and the confection heads are inserted within the compartments 15 of the magazine, brackets 71 will contact and displace the actuating arm 123 of switch 121 to thereby energize solenoid 103 and effect the release of the confections from the stickholders into the individual compartments of the magazine. As cam lug 91 passes from engagement with roller 89, the elevator section with its empty stickholder is raised to its up-position in alignment with the feeder and take-away track sections, and the lever 87 will swing to its vertical reset position. As the pusher bar proceeds rearwardly to pick up the next rearward loaded stickholder, pin 132 on the pusher bar displaces the switch 129 to closed position, thereby energizing solenoid 128, causing the latter to displace valve 127 to its position as shown in dotted lines in Figure 6, and causing the movement of the magazine to its delivery position. On the next ensuing forward stroke of the pusher bar switch 129 is actuated to open position, thereby causing the return of the magazine from its delivery position to its receiving position prior to the next ensuing cycle (starting with the return movement of the pusher bar) when the loaded stickholder will be again discharged into the magazine.

I claim:

1. A conveyor for horizontally transporting and vertically positioning articles comprising, a track having first and second horizontally extending track sections adapted to support an article carrier having an article release means for movement therealong, said second track section being mounted for vertical movement between an up-position in alignment with said first track section and a desired down-position, reciprocating drive means having forward and return strokes and adapted for intermittently moving said article carriers along said first track section and onto said second track section in one at a time order during said forward stroke, elevator drive means connected to said second track section for displacement thereof to said positions, a member carried by said first named drive means and engageable with said elevator drive means during said return stroke for actuating said elevator drive means to lower said second track section while one of said article carriers is positioned thereon, and means coordinated with a downward movement of said second track section to engage and operate said article release means.

2. A conveyor for horizontally transporting and vertically positioning articles comprising, a track having first and second horizontally extending co-terminus track sections adapted for support and movement therealong of an article carrier having article release means, said second track section having a length arranged to accommodate an article carrier in one-at-a-time order and mounted for vertical movement between an up-position in alignment with said first track section for receipt of an article carrier therefrom and a predetermined lowered position for effecting a desired positioning of said article carrier, lever means connected to said second track section for effecting its vertical reciprocation between said positions, reciprocating drive means having forward and return strokes and adapted for intermittently moving article carriers along said track and on to said second track section during said forward stroke, a member carried by said drive means and positioned for engagement with and actuation of said lever means on said return stroke to lower said second track section with an article carrier thereon, and means coordinated with a downward movement of said second track section to engage and operate said article release means.

3. In a conveyor for horizontally transporting and vertically positioning stickholders for confections having stick handles and edible heads, the stickholders being provided with means functioning on displacement to release the confections therefrom, a track having first and second horizontally extending track sections adapted to support the stickholders for movement therealong, said second track section being mounted for vertical movement between an up-position in alignment with said first track section and a desired down-position, drive means for intermittently moving the stickholders along said track to successively position the stickholders on said second track section, elevator drive means connected to said second track section and connected to and operated by said first named drive means to lower and raise said second track section while one of the stickholders is positioned thereon, and means coordinated with the downward movement of said second track section to engage and displace said stickholder release means.

4. In a conveyor for horizontally transporting and vertically positioning stickholders for confections having edible heads and stick handles, the stickholders being provided with means functioning on displacement to release the confections therefrom and being formed with outwardly extending support lugs and an upwardly extending handle, a pair of horizontally extending parallel feeder rails spaced and arranged to support for sliding movement thereon the support lugs of the stickholders, a pair of parallel take-away rails aligned with and horizontally spaced from said feeder rails, a pair of parallel elevator rails mounted for vertical displacement between an up-position in registry with said feeder and take-away rails to form a continuous track and a desired down-position, reciprocating drive means having drive and return strokes and engageable with the stickholder for moving the latter along said track in increments with one of the stickholders resting upon said elevator rails at the end of each of said drive strokes, elevator drive means connected to said elevator rails for lowering and raising thereof, actuating means connected to said elevator drive means, said first named drive means being formed for engagement with and operation of said actuating means, upon said return stroke for effecting said lowering and raising of said elevator rails, and means coordinated with the downward movement of said elevator rails to engage and displace said stickholder release means.

5. A conveyor for horizontally transporting and vertically positioning articles comprising, a stationary frame, a feeder track adapted for support and movement therealong of an article carrier and having one end terminating at said frame, a second track carried by said frame for vertical movement between an up-position in alignment with and contiguous to said first track for receipt therefrom of an article carrier and a predetermined lowered position, said second track having a length arranged to accommodate an article carrier in a one-at-a-time order, spring means connecting said second track and frame and normally supporting said second track in its up-position, drive means having drive and return strokes for intermittently moving article carriers along said tracks in increments with a carrier positioned upon said second track at the end of each drive stroke, and means cooperating with and actuated by said drive means on its return stroke to engage and effect downward displacement of said second track to its lowered position against the resistance of said spring means and releasing said second track for return of its up-position under the influence of said spring means prior to the next succeeding forward stroke of said drive means.

6. A conveyor for horizontally transporting and vertically positioning articles comprising, a stationary frame, a feeder track adapted for support and movement therealong of an article carrier and having one end terminating at said frame, a second track carried by said frame for vertical movement between an up-position in alignment with and contiguous to said first track for receipt therefrom of an article carrier and a predetermined lowered position, said second track having a length arranged to accommodate an article carrier in a one-at-a-time order, spring means connecting said second track and frame and normally supporting said second track in its up-position, drive means including a pusher bar mounted for lineal reciprocation above and parallel to said tracks and having a predetermined forward and return stroke, a plurality of lug members pivotally mounted to said pusher bar at spaced intervals and arranged upon appropriate rotative position to extend into proximity to said tracks for engagement with an article carrier thereon, stop means carried by said pusher bar and engageable with and normally supporting said lug members in said position and being further arranged for limiting the rotative displacement of said lug members in the direction of said return stroke so as to position said lug members to engage and urge said carriers along said tracks upon movement of said pusher bar in said forward stroke and to allow said lug members to pivot away from said carriers upon movement of said pusher bar in said stroke, and means cooperating with and actuated by said drive means on its return stroke to engage and effect downward displacement of said second track to its lowered position against the resistance of said spring means and releasing said second track for return to its up-position under the influence of said spring means prior to the next succeeding forward stroke of said drive means.

7. A conveyor for horizontally transporting and vertically positioning articles comprising, a stationary frame, a feeder track adapted for support and movement therealong of an article carrier and having one end terminating at said frame, a second track carried by said frame for vertical movement between an up-position in alignment with and contiguous to said first track for receipt therefrom of an article carrier and a predetermined lowered position, said second track having a length arranged to accommodate an article carrier in a one-at-a-time order, spring means connecting said second track and frame and normally supporting said second track in its up-position, drive means having drive and return strokes for intermittently moving article carriers along said tracks in increments with a carrier positioned upon said second track at the end of each drive stroke, a lever pivoted to said frame and connected to said second track for effecting its lowering as aforesaid, and means on said drive means engageable with said lever during the return stroke of said drive means to depress said second track to its lowered position against the resistance of said spring means and to release said lever and permit the return of said second track to its up-position under the influence of said spring means prior to the next succeeding forward stroke of said drive means.

8. A conveyor for horizontally transporting and vertically positioning articles comprising, a stationary frame, a feeder track having one end terminating at said frame and adapted for support and movement therealong of an article carrier having article release means, a second track carried by said frame for vertical movement between an up-position in alignment with and contiguous to said first track for receipt therefrom of an article carrier and a predetermined lowered position, said second track having a length arranged to accommodate an article carrier in a one-at-a-time order, spring means connecting said second track and frame and normally supporting said second track in its up-position, drive means having drive and return strokes for intermittently moving article carriers along said tracks in increments with a carrier positioned upon said second track at the end of each drive stroke, means cooperating with and actuated by said drive means on its return stroke to engage and effect downward displacement of said second track to its lowered position against the resistance of said spring means and releasing said second track for return to its up-position under the influence of said spring means prior to the next succeeding forward stroke of said drive means, solenoid actuated means carried by said second track and arranged for movement to engage and displace said article release means, an electric switch connected to said solenoid means, and means adjacent the lowered position of said second track and actuated by a predetermined movement of said second track for opening and closing said switch.

9. A conveyor for horizontally transporting and vertically positioning articles comprising, a stationary frame, a feeder track having one end terminating at said frame and adapted for support and movement therealong of an article carrier having article release means, a second track carried by said frame for vertical movement between an up-position in alignment with and contiguous to said first track for receipt therefrom of an article carrier and a pre-determined lowered position, said second track having a length arranged to accommodate an article carrier in a one-at-a-time order, spring means connecting said second track and frame and normally supporting said second track in its up-position, drive means having drive and return strokes for intermittently moving article carriers along said tracks in increments with a carrier positioned upon said second track at the end of each drive stroke, a lever pivoted to said frame and connected to said second track for effecting its lowering as aforesaid, means on said drive means engageable with said lever during the return stroke of said drive means to depress said second track to its lowered position against the resistance of said spring means and to release said lever and permit the return of said second track to its up-position under the influence of said spring means prior to the next succeeding forward stroke of said drive means, an electric solenoid actuator carried by said second track in position for engagement and displacement when energized of said article release means of said carrier, an electric switch adapted for connection to a source of electrical potential and being connected to said solenoid actuator for energizing thereof upon closing of said switch, and means connected to said second track and engaging and closing said switch upon movement of said second track to adjacent its lowered position.

10. A combined loading mechanism and bagging machine for frozen confections comprising, a conveyor for confections having a horizontal reciprocating member movable through drive and return strokes for advancing said confections in increments along said conveyor to a delivery position, said conveyor having a section at said delivery position mounted for vertical reciprocation, a confection bagging machine including a magazine mounted for horizontal reciprocation between receiving and delivery positions, two position valve means for controlling the reciprocation of said magazine and effecting in a first position movement of said magazine to said receiving position and in a second position movement of said magazine to said delivery position, said receiving position of said magazine being located directly under said conveyor section for receipt of confections therefrom in the lowered position of said section, means for reciprocating said member, means for reciprocating said section, operating means actuated by the drive stroke of said member for moving said valve means to said first position, and means actuated on the return stroke of said member for controlling the reciprocating means for said section to effect the lowering and raising thereof, said operating means being actuated after said last named means by the return stroke of said member for moving said valve to said second position.

References Cited in the file of this patent

UNITED STATES PATENTS

| Number | Name | Date |
|---|---|---|
| 980,030 | Vallone et al. | Dec. 27, 1910 |
| 1,462,510 | Lister | July 24, 1923 |
| 1,566,717 | Wolf | Dec. 22, 1925 |
| 1,977,008 | Neher | Oct. 16, 1934 |
| 2,067,301 | Miller | Jan. 12, 1937 |
| 2,277,688 | Cattonar | Mar. 31, 1942 |
| 2,332,058 | Cattonar | Oct. 19, 1943 |
| 2,370,381 | Vaughan | Feb. 27, 1945 |
| 2,535,231 | Rasmusson | Dec. 26, 1950 |
| 2,541,809 | Clark | Feb. 13, 1951 |
| 2,559,463 | Rasmusson | July 3, 1951 |